United States Patent Office  3,332,929
Patented July 25, 1967

3,332,929
COPPER COMPLEXES OF TRIAZINE CONTAINING MONOAZO DYESTUFFS
Cyril Morris and David Muir Wood, Manchester, England, assignors to Imperial Chemical Industries Limited, London, England, a corporation of Great Britain
No Drawing. Filed Feb. 16, 1962, Ser. No. 173,825
Claims priority, application Great Britain, Mar. 15, 1961, 9,492/61
5 Claims. (Cl. 260—146)

This invention relates to new azo compounds. More particularly the invention relates to metal complexes of monoazo compounds and to processes for their manufacture and use.

According to the invention there are provided the copper complex derivatives of the monoazo compounds of the formula:

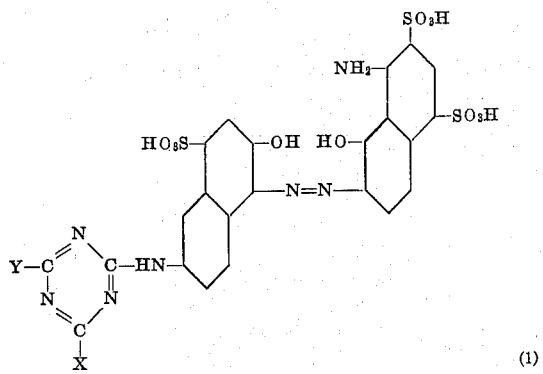

wherein X represents a halogen atom, or the radical of a quaternised tertiary amine connected by the quaternised nitrogen atom, and Y a disulphoanilino group.

It is preferred that X should represent a chlorine atom or a pyridinium-1-yl group.

As examples of groups represented by Y there may be mentioned, for example, 2,4-disulphoanilino, 2,5-disulphoanilino and 3,5-disulphoanilino groups.

According to a further feature of the invention there is provided a process for manufacture of the new azo dyestuffs which comprises reacting together equimolecular proportions of a trihalogen - 1,3,5 - triazine, especially cyanuric chloride, a disulphoaniline and the copper complex derivative of the monoazo compound of the formula:

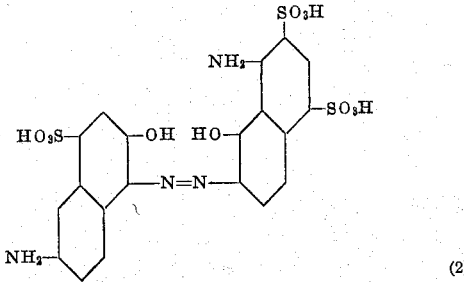

and, if necessary, replacing the remaining halogen atom on the triazine ring by reaction with a tertiary amine.

The quaternary group may be introduced for example, by treatment of the halogeno triazine compound with pyridine or other tertiary amine such as 1,4-diazabicyclo [2,2,2]octane.

The copper complex derivative used in this process may be obtained by coupling 6-nitro-4-sulphonaphthalene-1:2-diazo oxide with 1-amino-8-naphthol-2:4-disulphonic acid, treatment of the monoazo compound so obtained with sodium sulphide to reduce the nitro group and treatment of the product so obtained with a copper-yielding agent, such as copper sulphate.

As examples of disulphoanilines which may be used, there may be mentioned, for example aniline-2:4-, 2:5- and 3:5-disulphonic acids.

The new metal-complex monoazo dyestuffs are valuable for colouring cellulose textile materials, for example, textile materials comprising natural or regenerated cotton. For colouring such textile materials, the new metallised azo dyestuffs are preferably applied, either by a dyeing or printing process, to the cellulose textile materials in conjunction with a treatment with an acid-binding agent, for example sodium hydroxide, sodium carbonate or sodium bicarbonate, which may be applied to the cellulose textile material before, during or after the application of the dyestuffs. When so applied to cellulose textile materials the new metallised azo dyestuffs react with the cellulose and yield blue shades possessing excellent fastness to light, to washing and to acids and alkalis.

The invention is illustrated but not limited by the following examples in which parts are by weight.

Example 1

A solution of 7.55 parts of the disodium salt of aniline-2,5-disulphonic acid in 100 parts of water is added to a suspension of 4.7 parts of cyanuric chloride in a mixture of 30 parts of water and 100 parts of ice. The temperature of the mixture is maintained between 0° C. and 5° C. by external cooling, and the pH of the mixture is maintained between 5.5 and 6.5 by the addition of a 5% aqueous solution of sodium carbonate. A solution of 18.3 parts of the copper complex of 1':2-dihydroxy-6:8'-diamino-1:2'-azonaphthalene-4:5':7'-trisulphonic acid as the trisodium salt in 650 parts of water is added to the 2,4-dichloro-6-(2',5'-disulphoanilino)-s-triazine solution and the mixture is heated to 40° C. and maintained at that temperature for 1 hour. The pH of the mixture is simultaneously maintained at 6.0 to 6.5 by adding at intervals, a 5% aqueous solution of sodium carbonate. 150 parts of sodium chloride are then added and the dyestuff which separates is filtered off and dried at 20° C.

On analysis the dyestuff so obtained is found to contain 1 atom of organically bound chlorine per azo group. When applied to cellulose textile materials in conjunction with a treatment with an acid-binding agent, the dyestuff builds up well to give bright blue shades possessing good fastness to light and to washing.

Example 2

In place of the 7.55 parts of the disodium salt of aniline-2,5-disulphonic acid used in Example 1, there are used 7.55 parts of the disodium salt of aniline-3:5-disulphonic acid, and in place of the sodium chloride used to isolate the dyestuff in Example 1, there are used 2000 parts of acetone.

On analysis the dyestuff so obtained is found to contain 1 atom of organically bound chlorine per azo group. When applied to textile materials in conjunction with a treatment with an acid-binding agent, the dyestuff builds up well to give bright blue shades possessing good fastness to light and to washing.

Example 3

28.45 parts of the copper complex dyestuff obtained as described in Example 2 are dissolved in a mixture of 30( parts of water and 60 parts of pyridine. The solution is heated to 80° C. for 10 minutes and then cooled to 20° C The dyestuff is isolated by pouring the mixture into 125( parts of acetone, and filtering off and drying the precipitate at 20° C.

On analysis, it is found to contain no organically bound chlorine atoms. When applied to cellulose textile materials in conjunction with a treatment with an acid-binding agent, the dyestuff gives bright blue shades possessing good fastness to light and to washing.

What we claim is:

1. The copper complex derivatives of the monoazo compounds of the formula:

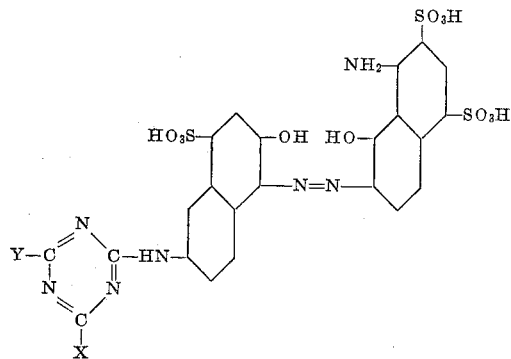

wherein X represents a member selected from the group consisting of chlorine and pyridinium-1-yl chloride connected by the quaternised nitrogen atom, and Y represents a disulphoanilino group.

2. Copper complex compounds according to claim 1 wherein Y stands for a 2,4-disulphoanilino group.

3. Copper complex compounds according to claim 1 wherein Y stands for a 2,5-disulphoanilino group.

4. Copper complex compounds according to claim 1 wherein Y stands for a 3,5-disulphoanilino group.

5. The copper complex compound of the monoazo dyestuff of the formula:

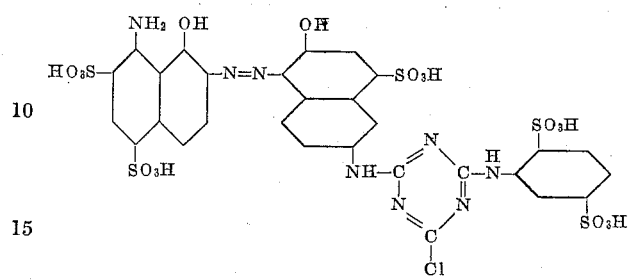

References Cited
UNITED STATES PATENTS
2,943,085   6/1960   Oesterlein _____ 260—146

CHARLES B. PARKER, *Primary Examiner.*

L. ZITVER, *Examiner.*

R. FINNEGAN, *Assistant Examiner.*